US012680318B2

(12) United States Patent
Kamath et al.

(10) Patent No.: US 12,680,318 B2
(45) Date of Patent: Jul. 14, 2026

(54) JOINT SUPPORT INCLUDING ENCAPSULATED ADHESIVE

(71) Applicant: CertainTeed Gypsum, Inc., Malvern, PA (US)

(72) Inventors: Mithun N. Kamath, Northborough, MA (US); Nicholas David Orf, Natick, MA (US); James Dimitrakopoulos, Conshohocken, PA (US); Michael House, Bend, OR (US); Michael Lemberger, Dudley, MA (US); Stephen Cline, Bend, OR (US)

(73) Assignee: CertainTeed Gypsum, Inc., Malvern, PA (US)

( * ) Notice: Subject to any disclaimer, the term of this patent is extended or adjusted under 35 U.S.C. 154(b) by 553 days.

(21) Appl. No.: 17/019,671

(22) Filed: Sep. 14, 2020

(65) Prior Publication Data

US 2021/0079273 A1 Mar. 18, 2021

Related U.S. Application Data

(60) Provisional application No. 62/900,193, filed on Sep. 13, 2019.

(51) Int. Cl.
| | |
|---|---|
| *E04F 19/02* | (2006.01) |
| *E04F 21/02* | (2006.01) |
| *E04F 21/165* | (2006.01) |

(52) U.S. Cl.
CPC ........ *E04F 19/028* (2013.01); *E04F 21/1657* (2013.01); *C09J 2301/122* (2020.08); *C09J 2301/412* (2020.08); *E04F 21/026* (2013.01)

(58) Field of Classification Search
None
See application file for complete search history.

(56) References Cited

U.S. PATENT DOCUMENTS

| | | |
|---|---|---|
| 5,045,374 A | 9/1991 | Tucker |
| 5,836,122 A | 11/1998 | Rennich et al. |
| 7,214,434 B2 | 5/2007 | Dalgleish et al. |
| (Continued) | | |

FOREIGN PATENT DOCUMENTS

| | | |
|---|---|---|
| JP | 2005-336358 A | 12/2005 |
| JP | 3073007 U | 11/2017 |

OTHER PUBLICATIONS

International Search Report and Written Opinion in International Patent Application No. PCT/US2020/050632, mailed Dec. 16, 2020.

*Primary Examiner* — Michael N Orlando
*Assistant Examiner* — Abhishek A Patwardhan
(74) *Attorney, Agent, or Firm* — McDonnell Boehnen Hulbert & Berghoff LLP

(57) ABSTRACT

The present disclosure relates generally to building surface joint supports, for example, suitable for covering a seam between two building surface panels, such as drywall. The present disclosure relates more particularly to a joint support including an encapsulated adhesive for securing the joint support to the building surface panels. The joint support includes a support strip having a width, a length, a first end, a second end, a contact surface, and an outer surface. An adhesive is disposed on the contact surface of the support strip. The adhesive includes a first set of capsules and each capsule of the first set of capsules includes a membrane enclosing a first component of an adhesive composition.

17 Claims, 8 Drawing Sheets

(56)     References Cited

U.S. PATENT DOCUMENTS

| | | | |
|---|---|---|---|
| 7,300,699 B2 * | 11/2007 | Sakai | C09J 11/06 |
| | | | 428/354 |
| 10,458,122 B2 | 10/2019 | Bodner et al. | |
| 2002/0189747 A1 * | 12/2002 | Steinwender | C09J 5/04 |
| | | | 156/304.1 |
| 2006/0073334 A1 * | 4/2006 | Schwantes | C08J 3/24 |
| | | | 428/402.2 |
| 2007/0021533 A1 | 1/2007 | Yan | |
| 2009/0022924 A1 * | 1/2009 | Griffin | B29C 65/4825 |
| | | | 156/60 |
| 2010/0012712 A1 * | 1/2010 | Swoboda | B31B 50/624 |
| | | | 493/131 |
| 2016/0289974 A1 * | 10/2016 | Smythe | E04F 19/028 |
| 2017/0284093 A1 * | 10/2017 | Lai | B32B 27/281 |
| 2017/0314275 A1 | 11/2017 | Rosenthal | |

* cited by examiner

JOINT SUPPORT INCLUDING ENCAPSULATED ADHESIVE

CROSS-REFERENCE TO RELATED APPLICATIONS

This application claims the benefit of priority of U.S. Provisional Patent Application No. 62/900,193, filed Sep. 13, 2019, which is hereby incorporated herein by reference in its entirety.

BACKGROUND OF THE DISCLOSURE

1. Field of the Disclosure

The present disclosure relates generally to building surface joint supports, for example, suitable for covering a seam between two building surface panels.

2. Technical Background

Building surface panels, such as drywall panels, are commonly used to create walls, ceilings, and other building surfaces in homes, businesses and other buildings. The panels are typically attached to a frame that holds the panels in place. Often, the edges between the panels are covered in order to create a smooth surface from one panel to the next. For example, in many instances, the joints or seams between adjacent panels are covered with a joint compound that is shaped to form a flat surface or clean corner at the joint. To strengthen the joint, the neighboring panels can be secured with a joint support, such as joint tape or a corner bead. The joint support aids in both securing the surface between the two panels, and in providing the desired shape at the seam.

Typical methods of installing a joint support include applying a preliminary layer of joint compound and fastening the joint support to the preliminary layer of joint compound. However, this method requires waiting for the first layer of joint compound to dry before moving on to subsequent steps. In some cases, the builder must wait up to 24 hours or longer before advancing to a subsequent step in the construction process. Other methods of installing joint supports use mechanical fasteners to attach the joint support to the building surface panels. For example, conventional metal corner beads are often attached to building surface panels using screws. This process is time consuming and requires the use of a specific tool. Moreover, it can require specific expertise to adequately obscure the mechanical fasteners after the building surface is completed. Accordingly, the present inventors have determined that a joint support that can be installed more easily and efficiently would be attractive to builders and customers.

SUMMARY OF THE DISCLOSURE

In one aspect, the present disclosure provides a joint support comprising:

a support strip including a width, a length, a first end, a second end, a contact surface and an outer surface; and an adhesive substance disposed on the contact surface of the support strip, the adhesive substance including:

a first set of capsules, each capsule of the first set of capsules including an outer membrane enclosing a first component of an adhesive composition.

In another aspect, the disclosure provides a method of installing a joint support according to the disclosure on a joint between two building surface panels, the method comprising:

placing the joint support over a first building surface panel and a second building surface panel so as to cover a portion of a seam between the first and second building surface panels and with the contact surface of the joint support adjacent to a surface of the building surface panels;

applying a stimulus to the joint support in order to release the first component of the adhesive composition from the capsules of the first set of capsules, wherein the adhesive composition attaches the joint support to the two building surface panels.

In another aspect, the disclosure provides a building surface construction comprising:

a first building surface panel;

a second building surface panel adjacent to the first building surface panel forming a seam between the first building surface panel and second building surface panel;

a joint support disposed over the first building surface panel and the second building surface panel and covering a portion of the seam, the joint support including a support strip having a width, a length, a first end, a second end, a contact surface facing the first building surface panel and the second building surface panel, and an outer surface;

an adhesive composition securing the joint support to the first building surface panel and the second building surface panel; and fragments of membranes of ruptured capsuled disposed in the adhesive composition.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

As described above, the present inventors have noted that conventional joint supports, such as corner beads, are time consuming to install. The present inventors have determined that a joint support that can be installed quickly and without the need for a preliminary layer of joint compound or mechanical fasteners would be attractive to builders.

Accordingly, one aspect of the disclosure is a joint support including a support strip including and an adhesive substance. The support strip includes a width, a length, a first end, a second end, a contact surface, and an outer surface. The adhesive substance is disposed on the contact surface of the support strip and includes a first set of capsules. Each capsule of the first set of capsules includes an outer membrane enclosing a first component of an adhesive composition.

Figure 1:
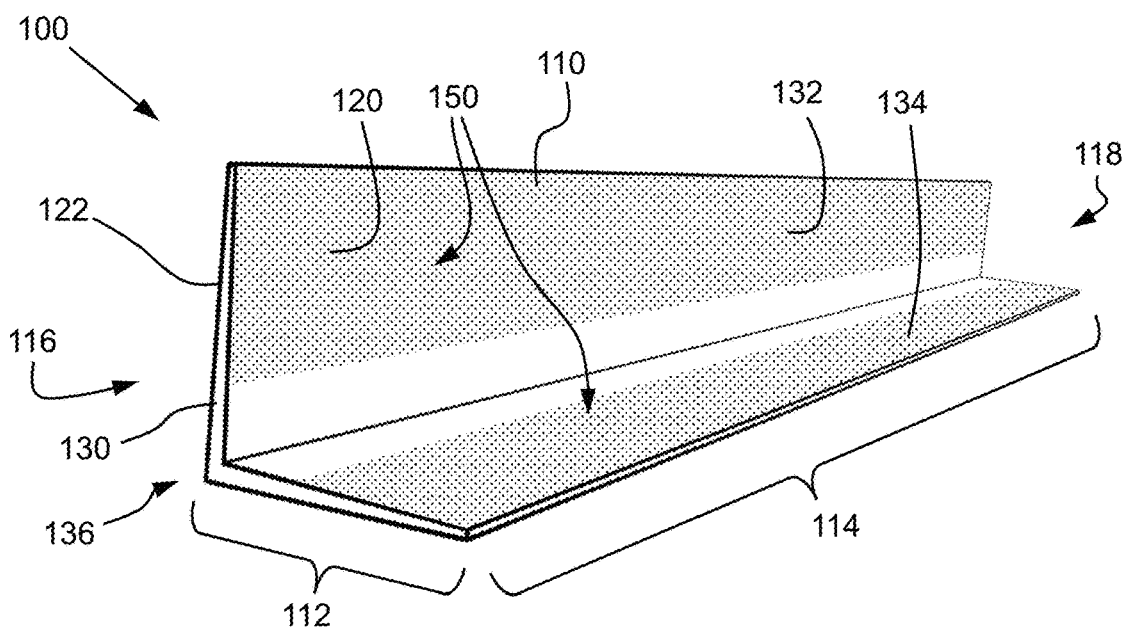
FIG. 1 is a schematic perspective view of a joint support according to an embodiment of the disclosure.

Such a joint support is shown in perspective view in FIG. 1. Joint support 100 includes a support strip 110 that has a width 112, a length 114, a first end 116 and a second end 118. Length 114 is the largest dimension of support strip 110 and is substantially greater than the width or breadth. Further, first end 116 and second end 118 are defined with respect to length 114. Joint support 100 also includes a contact surface 120 configured to contact the surface of a building surface panel and an outer surface 122 opposite contact surface 120. Joint support 100 also includes an adhesive substance 150 disposed on contact surface 120 of support strip 110. As shown in the detailed view of FIG. 2, adhesive substance 150 includes a first set of capsules 152. Each capsule 154 of the first set of capsules 152 includes a membrane 156 that encloses a first component 158 of an adhesive composition.

The term adhesive composition, as used herein, refers to the materials that assist in adhering the support strip to a surface. In contrast the term adhesive substance, as used herein, refers to the components on the contact surface of the support strip that both form and retain the adhesive composition. Thus, the adhesive substance includes the adhesive composition as well as the material encapsulating the adhesive composition (e.g., capsule membranes that retain the adhesive composition).

The adhesive composition allows the joint support to be conveniently attached to building surface panels without a layer of joint compound between the joint support and the panels. Accordingly, subsequent steps in the construction of the building surface can be carried out as soon as the adhesive is set, and without the need to wait for a layer of joint compound to dry. Furthermore, the adhesive composition also allows the joint support to be installed without requiring metal fasteners, which can lead to increased efficiency in the installation. By encapsulating the first component of the adhesive composition within the capsules, the joint support can be transported and handled without the adhesive composition unexpectedly attaching to other surfaces collecting dirt and debris.

Figure 2:
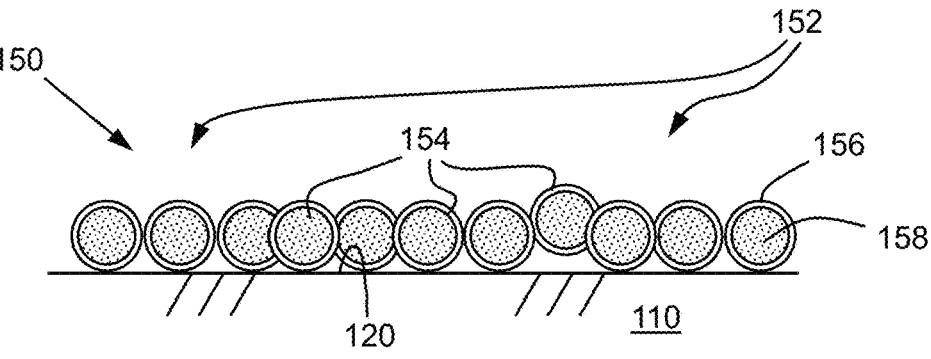
FIG. 2 is a schematic detailed cross-sectional side view of an adhesive substance on a surface of the joint support of FIG. 1.
Figure 3:
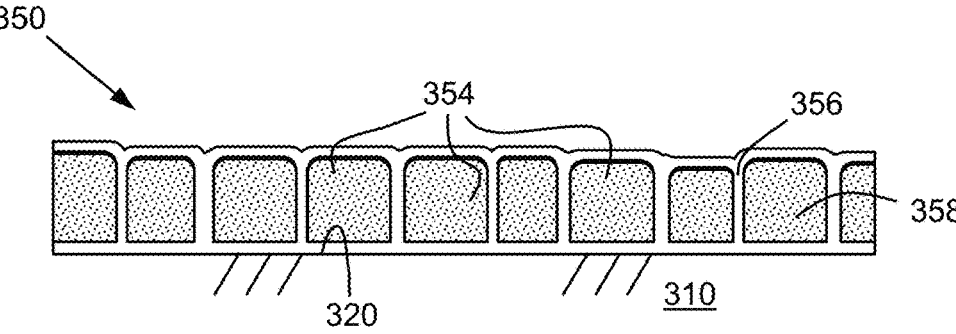
FIG. 3 is a schematic detailed cross-sectional side view of an adhesive substance on a surface of a joint support according to another embodiment of the disclosure.

In some embodiments, the capsules are independent bodies, where a small mass of the adhesive component is enclosed in a distinct membrane that individually surrounds the adhesive component. For example, the capsules 154 in FIG. 2 are each independent bodies with an individual membrane 156 in the form of a spheroid surrounding a mass of first adhesive component 158. In other embodiments, the capsules are each part of a larger multi-capsule structure. For example, in FIG. 3, adhesive substance 350 includes a layer of open pores disposed on the contact surface 320 of support strip 310, where the pores encapsulate the first adhesive component 358, i.e., with the pore walls defining capsules holding the first adhesive component. The porous layer forms membranes 356 that surround the first adhesive component 358 in distinct capsules 354. In many instances the membranes 356 are shared between neighboring capsules 354.

In certain embodiments as otherwise described herein, the adhesive composition is formed from a single component, and the first component held in the capsules constitutes the entire adhesive composition. In such instances, the release of the adhesive composition from the first set of capsules allows the adhesive composition to spread across the contact surface of the support strip and the building surface panels in order to adhere the support strip to the panels. In some embodiments, the adhesive composition sets by drying or by interacting with a substance in the environment, such as oxygen or moisture. Once the adhesive composition sets, the joint support is securely attached to the building surface panels.

In other embodiments of the joint support as otherwise described herein, the adhesive substance includes a second component of the adhesive composition. For example, the adhesive composition may include a second component that is different than the first component and that is designed to interact with the first component to aid in generating the bond between the support strip and the building surface panels. For example, as explained in more detail below, in some embodiments the first component comprises an adhesive monomer and the second component comprises a solvent that dissolves the monomer. In other embodiments, the first component comprises a catalyst and the second component comprises a monomer that is polymerized by the catalyst. Other combinations are described in more detail below, and still further combinations will be readily apparent to one of ordinary skill in the art.

Figure 4:
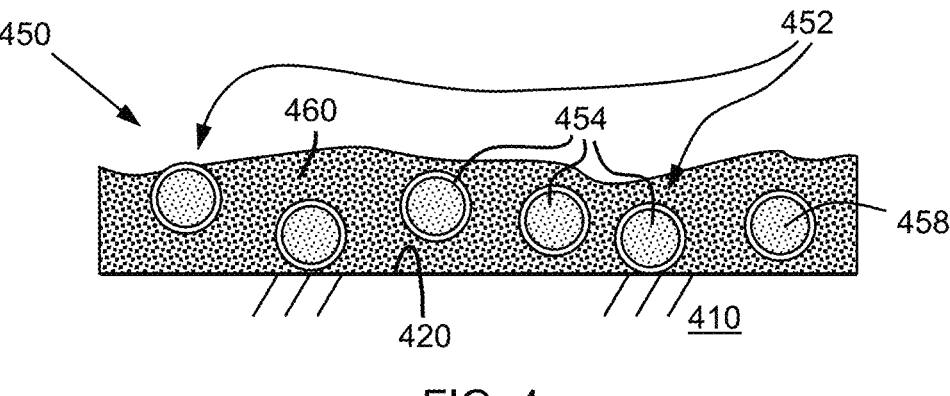
FIG. 4 is a schematic detailed cross-sectional side view of an adhesive substance on a surface of a joint support according to another embodiment of the disclosure.

In certain embodiments of the joint support as otherwise described herein, the second component is disposed outside of the capsules. An adhesive substance including such a second component is shown in FIG. 4. Adhesive substance 450 is disposed on contact surface 420 of support strip 410. Adhesive substance 450 includes a first set 452 of capsules 454 that enclose a first component 458 of an adhesive composition. Adhesive substance 450 also includes a second component 460 that forms a medium around the capsules 454 holding first component 458. Second component 460 is not disposed in any capsules, and instead is provided directly on the contact surface 420.

Figure 5:
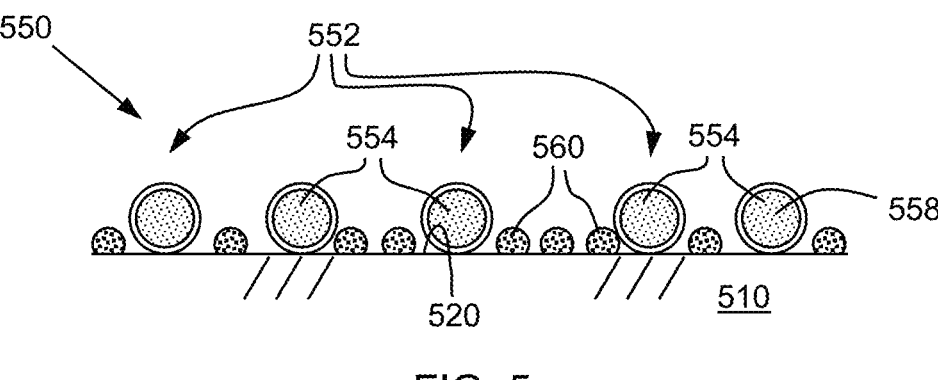
FIG. 5 is a schematic detailed cross-sectional side view of an adhesive substance on a surface of a joint support according to another embodiment of the disclosure.

In certain embodiments of the joint support, each capsule of the first set of capsules is at least partially surrounded by the second component. For example, each capsule 454 of first set 452 is partially or entirely surrounded by second component 460. Accordingly, when capsules 454 rupture, the first component 458 of the adhesive composition will come into contact with second component 460 as it is released from the capsules 454. In other embodiments, the first set of capsules and the second component are each individually affixed to the contact surface. For example, adhesive substance 550 shown in FIG. 5 includes a first set 552 of capsules 554 that are disposed on contact surface 520 and droplets of second component 560 that are affixed to contact surface 520. When capsules 554 rupture, the first component 558 of the adhesive composition spread along contact surface 520 of support strip 510 and mix with second component 560 of the adhesive composition. In some embodiments, the capsules of the first component of the adhesive composition and the second component of the adhesive composition are scattered on the contact surface. In other embodiments, the capsules of first component and the second component are applied to the contact surface in a regular pattern. In some embodiments, the capsules and the second component of the adhesive composition are in contact, while in other embodiments they are separated.

In certain embodiments of the joint support as otherwise described herein, the first set of capsules is embedded in the second component. In certain embodiments the second component assists in adhering the first set of capsules to the surface or acts as a binder. For example, in some embodiments, the second component serves to fasten the capsules to the surface and can enhance their stability under conditions of manufacture, transport, storage, or installation. Such an embodiment is shown in FIG. 4. The first set 452 of capsules 454 of adhesive substance 450 are embedded in the second component 460 of the adhesive composition, which is dispersed over contact surface 420. Accordingly, second component 460 assists in securing capsules 454 to contact surface 420. Further, in some embodiments, the second component serves to disperse the capsules evenly on the surface or stabilize them chemically or mechanically.

Figure 6:
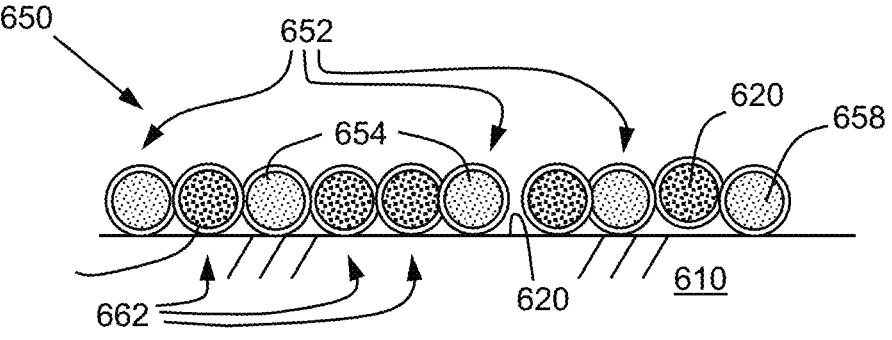
FIG. 6 is a schematic detailed cross-sectional side view of an adhesive substance on a surface of a joint support according to another embodiment of the disclosure.

In certain embodiments of the joint support as otherwise described herein, the adhesive substance includes a second set of capsules and the second component is disposed in the capsules of the second set of capsules. Such an embodiment of the adhesive substance is shown, for example, in FIG. 6. Adhesive substance 650 includes a first set 652 of capsules 654 that are affixed to contact surface 620 of support strip 610 and enclose a first component 658 of an adhesive composition. Adhesive substance 650 also includes a second set 662 of capsules 664 that enclose second component 660 of the adhesive composition. Upon rupturing of the capsules 654, 664, the first component 658 and second component 660 of the adhesive composition will spread across the contact surface 620 and interact with one another to activate the adhesive composition.

In certain embodiments of the joint support as otherwise described herein, the capsules of the first set of capsules are configured to release the first component upon the application of a stimulus. For example, upon rupture, dissolution, melting, or other loss of integrity of the capsules, the first component is no longer confined by the capsules and assists in adhering the support strip to the panels. The use of an adhesive substance that does not become tacky until the application of the stimulus of choice can be advantageous by allowing the joint support to be handled more easily during manufacture, transport, and installation.

In certain embodiments of the joint support as otherwise described herein, the stimulus is the application of pressure. The pressure serves to mechanically rupture the capsules as well as push the panels, adhesive substance, and support strip together. In some embodiments, the pressure required to burst the capsules is moderate, e.g., that applied by a builder, for example by hand or with a rolling tool. In other embodiments, the pressure required to burst the capsules is large, e.g., hundreds of psi, and can be applied by a specialized tool or a machine. As will be appreciated by those of skill in the art, the necessary pressure to cause the capsules to burst can depend on the adhesive substance formulation and other considerations such as the integrity of the panels and the support strip.

In certain embodiments of the joint support as otherwise described herein, the stimulus is the application of heat. In such embodiments, the application of heat causes the capsules to melt, soften, become porous, or otherwise lose their structural integrity. In some embodiments, heat is applied through a heating apparatus, e.g., a blanket or heat gun, or through friction or radiation. In other embodiments, heat is provided merely by allowing the adhesive substance to come to room temperature from a temperature below room temperature.

In certain embodiments of the joint support as otherwise described herein, the stimulus is radiation. In certain embodiments, radiation is selected from a variety of wavelengths, including, for example, ultraviolet, visible, near-infrared and infrared. In some embodiments, the radiation serves to rupture the capsules directly. In other embodiments, the radiation is absorbed to cause the capsules to increase in temperature and thereby rupture.

Moreover, radiation-induced polymerization is well known in the art and in certain embodiments as otherwise described herein radiation serves to induce polymerization or curing of the adhesive substance. For example, a photoinitiator can be included in the adhesive substance are selected to absorb certain wavelengths of radiation and create chemical species (e.g., free radicals or acidic function). In certain embodiments, the radiation that ruptures the capsules can cause curing of the adhesive substance. But in other embodiments, the capsules can be ruptured in some other fashion.

In certain embodiments of the joint support as otherwise described herein, the stimulus is the addition of solvent. In some embodiments, the solvent serves to dissolve the capsules directly. In other embodiments, the solvent dissolves a portion of the adhesive substance that is outside of the capsules. For example, dissolution of a stabilizing agent causes the capsules to dissolve or rupture. In certain embodiments, the solvent also serves to dissolve the various components of the adhesive substance and allow them to react. In some embodiments, the solvent is aqueous, e.g., water, or non-aqueous, e.g., acetone or mineral oil. In certain embodiments, the solvent is volatile such that it evaporates over time. In other embodiments, the solvent is non-volatile. The solvent may be selected using a wide variety of factors including relative solubility of the reactive species, the solubility of the product, the interaction of the solvent with other components of the adhesive substance, the vapor pressure, and toxicity, among other factors. For example, the solvent may be a pure substance or a mixture of substances. Examples of useful solvents that may be used as the stimulus include water, petroleum oils, vegetable oils, vegetable oil esters, liquid hydrocarbon resins, liquid plasticizers, organic solvents and blends thereof.

In certain embodiments of the joint support as otherwise described herein, the stimulus is the application of ultrasonic energy. In some embodiments, ultrasonic energy serves to rupture the capsules directly as they absorb the ultrasonic energy. In other embodiments, ultrasonic energy induces cavitation and local heating which leads to capsule rupturing. In certain embodiments, the adhesive substance is formulated to efficiently absorb ultrasonic energy, leading to rapid heating. The increase in temperature may have a variety of effects, including increasing reaction speed and decreasing capsule integrity.

In certain embodiments of the joint support as otherwise described herein, a combination of stimuli is utilized. For example, the simultaneous application of pressure and radiation, or heat and radiation, or pressure and solvent is utilized to rupture the capsules.

In certain embodiments of the joint support as otherwise described herein, the intensity of the stimulus is adjusted as needed based upon the precise formulation to allow complete capsule rupture. In other embodiments, the intensity is lowered to provide for only partial capsule rupture. In still other embodiments, the stimulus is selectively applied briefly to the adhesive substance or to only a portion of the adhesive substance in order to rupture a subset of the capsules. This approach allows selection of the quantity of adhesion and, in certain embodiments, allows future re-adhesion by the application of additional stimulus.

In certain embodiments of the joint support as otherwise described herein, the capsules release the first component by melting. For example, application of heat raises the temperature of the capsule membrane above the melting transition temperature of the membrane material. In certain embodiments, this causes the membrane to lose structural integrity and allow release of the first component. In other embodiments, melting is induced by a chemical that alters the membrane to have a lower melting temperature, or by a local temperature increase from a source other than conventional heating.

In certain embodiments of the joint support as otherwise described herein, the capsules release the first component by dissolving. In certain embodiments, the membrane is brought into contact with an appropriate solvent or other chemical that effectively dissolves the membrane and results in the first component being released. In some embodiments, this is due to the application of a solvent as a stimulus. In other embodiments, the release of a solvent is from another part of the adhesive substance. For example, in some embodiments the application of heat raises an endogenous chemical above its melting temperature, resulting in a liquid solvent that then serves to dissolve the membrane and cause the capsule to release the first component.

In certain embodiments of the joint support as otherwise described herein, the first component of the adhesive composition includes a monomer, oligomer or polymer based on at least one of alkyl acrylate, acrylic acid-alkyl acrylate, methacrylate, epoxy resins, polyvinyl acetate, isocyanate, urethane (e.g., urethane (meth)acrylate), and styrene-butadiene resin. In certain embodiments, one or more of these act as unpolymerized monomers, polymer precursors, or adhesive precursors, e.g., that can cure to polymeric form when the joint support is applied to a joint. In certain embodiments, the adhesive and adhesive precursors are selected to provide compatibility with the other materials and provide a necessary amount of strength once cured. Many other adhesives and adhesive precursors are known in the art with different modes of operation and may be used as the first component of the adhesive composition.

Further examples of suitable alkyl acrylates include isobutyl acrylate, n-propyl acrylate, n-butyl acrylate, ethyl acrylate, isopropyl acrylate, 2-ethylhexyl acrylate, lauryl acrylate, lauryl methacrylate, isodecyl acrylate, isooctyl acrylate, tridecyl methacrylate, tridecyl acrylate, 2-ethylhexyl methacrylate, or caprolatone acrylate. A large number of related acrylates are known in the art and can be appropriately selected by one of ordinary skill to meet the precise properties desired as the first component of the adhesive composition.

In certain embodiments of the joint support as otherwise described herein, the first component of the adhesive composition includes a curing agent. Curing agents serve to harden, toughen, or otherwise modify polymers. For example, some curing agents serve to cross-link adjacent polymer chains. In other embodiments, curing agents are activated by external stimuli including heat, light, or solvent. In certain embodiments, curing agents are regenerated during the curing reaction and function as a catalyst. In other embodiments, the curing agent is incorporated into the polymer structure. Examples of useful curing agents are boron trifluoride complexes, nitrile or aniline type catalysts, acid chloride, hexamethylenetetramine, various oxides, e.g., metal oxides, tin compounds, e.g., dibutyltin dilaurate, and the like. In certain embodiments, the curing agent takes the form of a catalyst. Catalysts are well known in the art and serve to accelerate the desired chemical reaction. In certain embodiments, the catalyst imparts desired characteristics upon the reaction product, for instance by favoring one product over another. Examples of types of catalysts that may be included in the first component of the adhesive composition include acids, inorganic complexes and materials, and organic molecules. The classes of initiators and curing agents as described herein often overlap with catalysts and a single substance may belong to multiple categories. Many polymerization catalysts are known in the art and may be selected for use by one of ordinary skill to be included in the first component of the adhesive composition.

In certain embodiments of the joint support as otherwise described herein, the first component of the adhesive composition includes an initiator. In certain embodiments, initiators serve to begin polymerization reactions. In some embodiments the initiator is a thermal polymerization initiator. A thermal polymerization initiator serves to generate reactive species such as free radicals or acidic species upon exposure to heat. Examples of thermal polymerization initiators include azo compounds such as 2,2'-azobis(isobutyronitrile), organic peroxides such as benzoyl peroxides, benzenesulfonic acid esters, and alkylsulfonium salts. In other embodiments the initiator is a photoinitiator, whereby the photoinitiator absorbs radiation and generates reactive species such as free radicals, cations, or anions that initiate polymerization. A wide variety of photoinitiators are known in the art. Examples that may be included in the first component of the adhesive composition include phenone-based radical photoinitiators, sulfonium- and iodonium-based cationic photoinitiators, and oxime-, carbamate-, or oxoxanthen-based anionic photo initiators.

In certain embodiments of the joint support as otherwise described herein, the first component of the adhesive composition includes a solvent. In certain embodiments, the solvent serves to dissolve at least one component of the adhesive composition, either before or after activation of the adhesive substance. In some embodiments, the dissolved at least one component imparts favorable characteristics upon the adhesive composition. The exact identity of the solvent is selected from a wide variety of factors including relative solubility of the reactive species, the solubility of the product, the interaction of the solvent with other components of the adhesive substance, the vapor pressure, and toxicity, among other factors. Solvents which may be included in the first component of the adhesive composition can be pure substances but are often mixtures of substances as well. Examples of useful solvents which may be included in the first component of the adhesive composition include water, petroleum oils, vegetable oils, vegetable oil esters, liquid hydrocarbon resins, liquid plasticizers, organic solvents and blends thereof.

In certain embodiments of the joint support as otherwise described herein, the first component of the adhesive composition the adhesive composition includes a temperature-induced phase change material. In certain embodiments, this material serves to structurally or chemically stabilize the adhesive composition unless the temperature is raised to a certain point, at which the phase change occurs and the stabilization removed. In some embodiments, the phase change material rigidly prevents components of the adhesive substance from reacting chemically. In some embodiments, the phase change material acts as a solvent upon melting. Examples of such materials include n-docosane, n-eicosane, n-heneicosane, n-heptacosane, n-heptadecane, n-hexacosane, n-hexadecane, n-nonadecane, n-octasane, n-octadecane, n-pentacosane, n-pentadecane, n-tetracosane, n-tetradecane, n-tricosane, and n-tridecane. More generally, any material that undergoes a change in phase within a useful temperature range is desirable and may be included in the first component of the adhesive composition.

In certain embodiments of the joint support as otherwise described herein, the first component of the adhesive composition includes a stabilizing agent. In certain embodiments, stabilizing agents serve to prevent unwanted reactivity during manufacture, storage, or installation of the adhesive substance. In some embodiments, stabilizing agents also guard against accidental exposure to light, heat, or oxygen that would otherwise serve to degrade the performance of the adhesive substance. Examples of useful stabilizing agents that may be included in the first component of the adhesive composition include certain plastic materials such as 2,2-dimethyloyl-1,3-propanediol and 2-hydroxymethyl-2-methyl-1,3-propandiol and the like.

In certain embodiments of the joint support as otherwise described herein, the membrane of each of the first set of capsules includes at least one of gelatin, gelatin-gum Arabic, melamine formaldehyde, methylol urea, urea formaldehyde, urea-resorcinol-formaldehyde, urea-melamine-formaldehyde, methylol melamine, methylated dimethyl urea, a gelatin anionic polymer, polyamide, and alkyl acrylate-acrylic acid copolymer. In some embodiments the membrane material is chosen to be compatible with synthesis methods, compatibility with the component that the capsule is to contain, and ability to maintain integrity until the application of the stimulus. In some embodiments, materials used in the field of coacervation, waxes, polymers, and combinations thereof are particularly useful. In some embodiments, the membrane material of the first set of capsules is the same as the membrane material of the second set of capsules. In other embodiments, the membrane material of the first and second set of capsules is different. For example, the use of different membrane materials allows the rupture of the first set of capsules with the application of a certain stimulus that does not result in the rupturing of the second set of capsules. A second stimulus may then be applied to rupture the second set. In other embodiments, the sets of capsules rupture due to the same stimulus but under different intensity of the stimulus, leading one set to rupture before the other set. Various scenarios can be constructed to aid the formulation of an adhesive substance that fulfills the particular needs of a support strip and can be chosen by one of ordinary skill in the art.

In certain embodiments of the joint support as otherwise described herein, the capsules have an average diameter between 0.1 microns and 3000 microns, e.g., 1 micron and 500 microns, e.g., 5 microns and 100 microns. In certain embodiments, the size of the capsules depends on the manner of preparation, the other components of the adhesive substance, and the desired structural and chemical characteristics of the capsules.

In certain embodiments of the joint support as otherwise described herein, the contact surface of the support strip is textured. For example, in some embodiments, the contact surface includes a plurality of protruding structures in the form of ridges, posts, whiskers or undulations that extend outward from the surface. In some embodiments, the first set of capsules is disposed between the protruding structures. Accordingly, in some embodiments, prior to installation of the joint support, the protruding structures can help protect the capsules from inadvertent release of the first component of the adhesive composition. Further, in some embodiments, the protruding structures can serve as mixing elements to help mix or spread components of the adhesive composition, for example when the structures are briefly pushed back and forth against an opposing surface.

In certain embodiments of the joint support as otherwise described herein, the joint support is a corner bead. For example, joint support 100, shown in FIGS. 1 and 2, is a corner bead that is configured to cover a joint between two panels that meet at a corner of a building surface.

In certain embodiments of the joint support as otherwise described herein, the support strip has a body that includes a first elongate flange extending from the first end of the support strip to the second end of the support strip, and a second elongate flange extending from the first end of the support strip to the second end of the support strip. For example, as shown in FIG. 1, support strip 110 of joint support 100 includes a body 130 having a first elongate flange 132 that extends from first end 116 to second end 118 and a second elongate flange 134 that also extends from first end 116 to second end 118. At least a portion of the first elongate flange 132 is configured to cover an edge of a first building surface panel and, likewise at least a portion of the second elongate flange 134 is configured to cover an edge of a second building surface panel. Accordingly, the support strip 110 may cover both edges of a joint between the two building surface panels.

Figure 7:
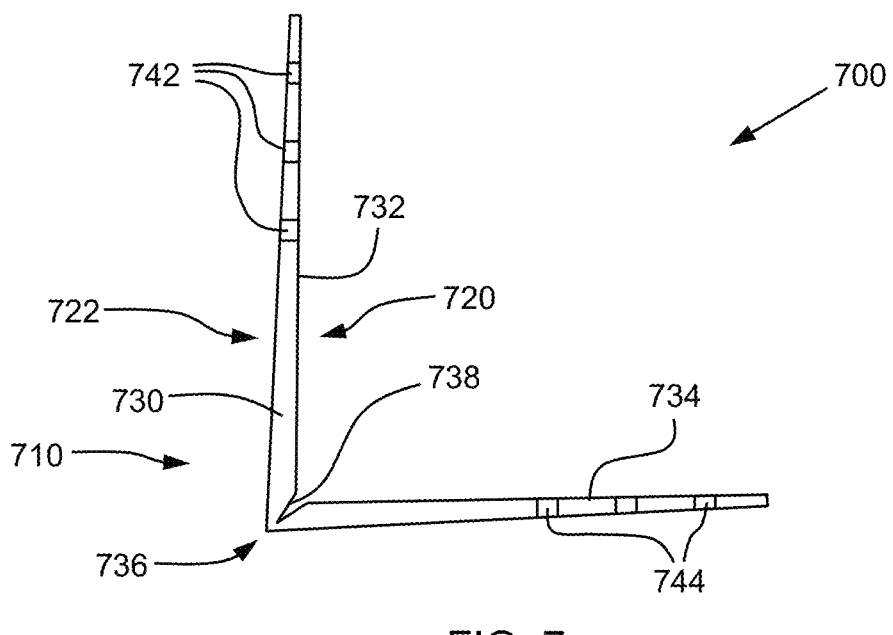
FIG. 7 is a schematic end view of a joint support according to another embodiment of the disclosure.

In certain embodiments of the joint support as otherwise described herein, the body includes a sharp corner connecting the first elongate flange and the second elongate flange. For example, body 130 of joint support 100 includes a sharp corner 136 that connects first elongate flange 132 to second elongate flange 134. The sharp corner 136 provides a clean sharp corner edge where the joint support 100 covers the seam between the building surface panels. Another embodiment of a joint support including such a sharp corner is shown in FIG. 7. Joint support 700 includes a body 730 with a first flange 732 and a second flange 734 that are connected by a sharp corner 736.

In certain embodiments of the joint support as otherwise described herein, the body includes a groove disposed on an inside surface of the sharp corner connecting the first elongate flange and the second elongate flange. For example, the body 730 of joint support 700 includes a groove 738 disposed on the inside surface of sharp corner 736. Groove 738 allows the first elongate flange 732 and the second elongate flange 734 to flex with respect to one another as the corner bead is placed over the corner formed by the adjacent building surface panels. This allows the joint support 700 to be operable with a range of angles between two building surface panels.

Figure 8:
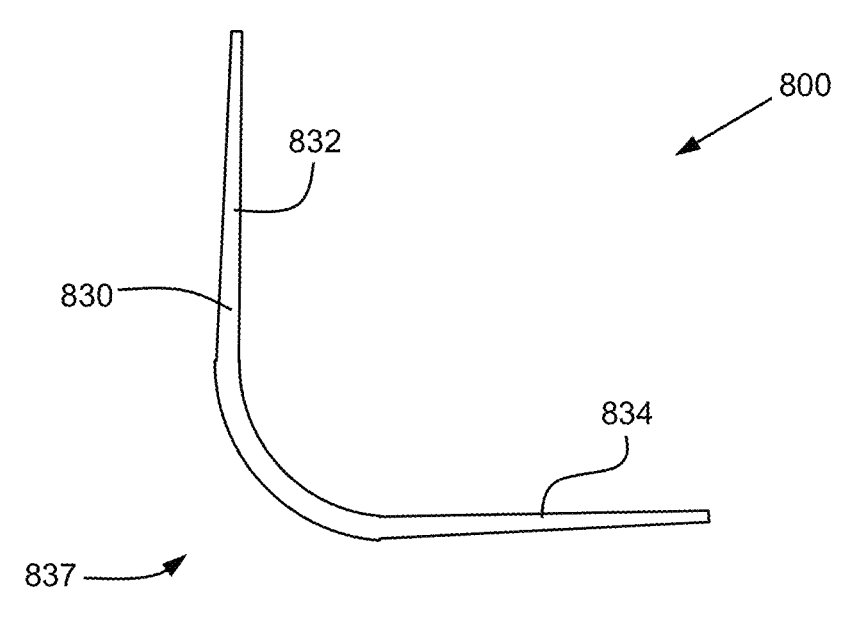
FIG. 8 is a schematic end view of a joint support according to yet another embodiment of the disclosure.

In certain embodiments of the joint support as otherwise described herein, the body includes a rounded corner connecting the first elongate flange and the second elongate flange so as to form a bull-nose corner bead. Such a joint support is shown in FIG. 8. Joint support 800 has a body 830 that includes a first elongate flange 832 and a second elongate flange 834. Further, the first and second elongate flanges 832, 834 are connected to one another by a rounded corner 837, such that joint support 800 is constructed as a corner bead with a bull nose configuration. The rounded corner 837 of joint support 800 allows a uniform round edge to be provided at the seam between two building surface panels that are disposed at an angle to one another.

In certain embodiments of the joint support as otherwise described herein, the first elongate flange and second elongate flange are is disposed at an angle in a range from 45° to 160° from one another, e.g., from 60° to 120°, e.g., from 80° to 90°. For example, in joint support 100, first elongate flange 132 is disposed at an angle of slightly less than 90° from second elongate flange 134. Accordingly, the joint support 100 will impose a slight gripping force on two building surface panels that are disposed at a right angle from one another.

In certain embodiments of the joint support as otherwise described herein, the first elongate flange includes perforations therethrough. For example, first elongate flange 732 in joint support 700 includes perforations 742 that extend from the inner contact surface 720 to the outer surface 722. Likewise, second elongate flange 734 also includes perforations 744 extending therethrough. The perforations 742, 744 allow a joint compound to extend through the joint support 700, which enhances the connection of the joint support 700 to any building surface panels on which it is secured.

In certain embodiments of the joint support as otherwise described herein, the first elongate flange tapers so as to have a greater thickness adjacent to the second elongate flange and a smaller thickness at an outer edge. For example, first elongate flange 732 of joint support 700 is thicker at corner 736, where it is adjacent to second elongate flange 734, and tapers toward an outer edge where it is thinner. Likewise, second elongate flange 734 is also thicker at corner 736 and tapers toward an outer edge.

Figure 9:
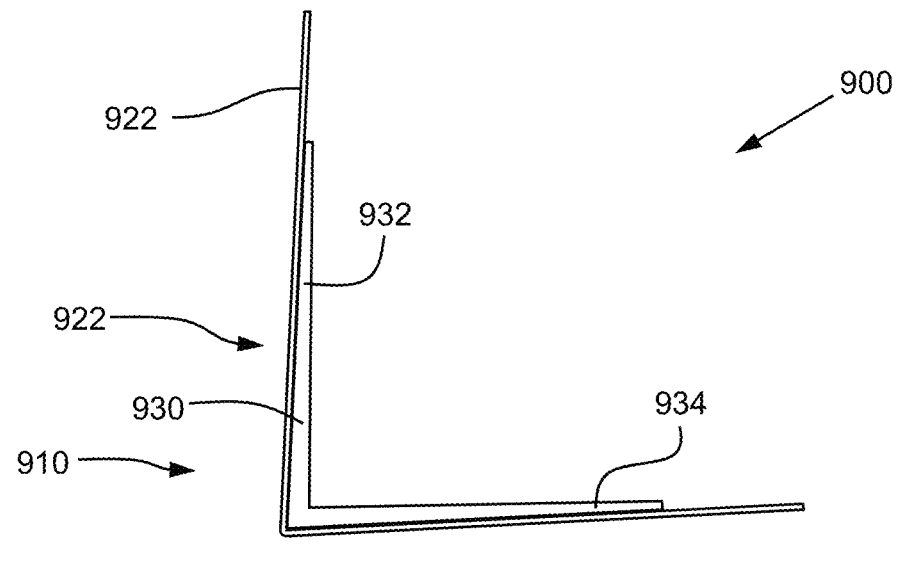
FIG. 9 is a schematic end view of a joint support according to another embodiment of the disclosure.

In certain embodiments of the joint support as otherwise described herein, the support strip includes a facing sheet disposed at the outer surface. Such a joint support is shown in FIG. 9. Joint support 900 includes a body 910 having a first elongate flange 932 and a second elongate flange 934. A facing sheet 944 is attached to the outside surface of body 910 at the outer surface 922 of joint support 900. Such a facing sheet can provide a smooth transition from the joint support to the building surface panel so as to minimize the visibility of the edge of the joint support. Moreover, the facing sheet can also enhance adhesion of a joint compound to the joint support. In some embodiments, the facing sheet is a paper facing. In other embodiments the facing sheet is a fiber mat. Other materials may also be used for the facing sheet, as will be appreciated by those of ordinary skill in the art.

Figure 10:
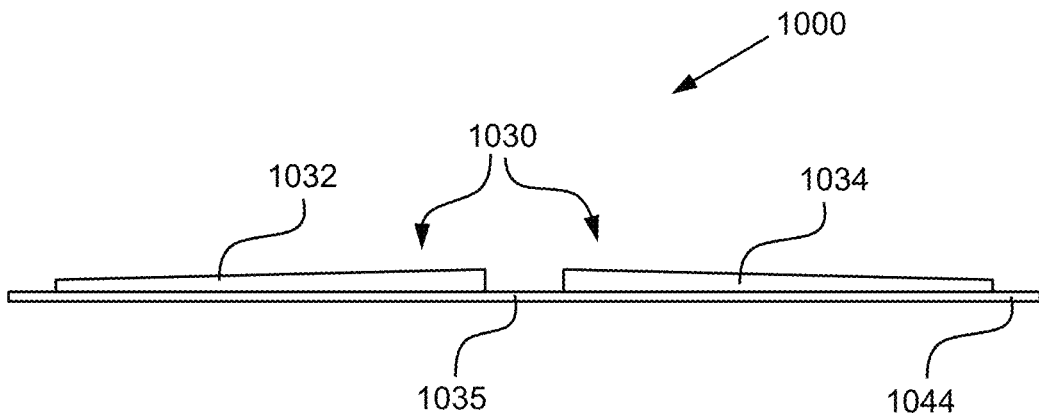
FIG. 10 is a schematic end view of a joint support according to still another embodiment of the disclosure.

In certain embodiments of the joint support as otherwise described herein, the first elongate flange is connected to the second elongate flange by a flexible hinge. Such a joint support is shown in FIG. 10. Joint support 1000 includes a body 1030 having a first elongate flange 1032 and a second elongate flange 1034. The first and second elongate flanges 1032, 1034 are connected to one another by a flexible hinge 1035 formed by a facing sheet 1044. The flexible hinge 1035 allows the joint support 1000 to fit over a seam between building surface panels disposed at any angle to one another, including parallel panels. Furthermore, the use of flexible hinge 1035 also permits the joint support 1000 to be formed in a roll for convenient storage and transport.

In certain embodiments of the joint support as otherwise described herein, the body is formed of plastic. For example, in some embodiments, the body includes at least one of High Density Polyethylene (HDPE), Polyethylene Terephthalate (PET), or Acrylonitrile Butadiene Styrene (ABS).

In certain embodiments of the joint support as otherwise described herein, the body is reinforced with a fibrous material. For example, in some embodiments, the body is reinforced with glass fibers. In other embodiments the body is reinforced with cellulous or other fibers.

In certain embodiments of the joint support as otherwise described herein, the body is formed of metal. For example, in some embodiments the body of the support strip is formed of steel. In other embodiments, the body is formed of aluminum or an aluminum alloy.

In certain embodiments of the joint support as otherwise described herein, a width of the first elongate flange is in a range from ⅝ inch to 5 inches, e.g., 1 inch to 3 inches, e.g., from 1.5 inches to 2 inches. Further, in some embodiments, a length of the joint support is in a range from 4 feet to 20 feet, e.g., from 6 feet to 15 feet, e.g., from 8 feet to 12 feet.

In another aspect the disclosure provides a method of installing a joint support according to the disclosure on a joint between two building surface panels. The method includes placing the joint support over a first building surface panel and a second building surface panel so as to cover a portion of a seam between the first and second building surface panels and with the contact surface of the joint support adjacent to a surface of the building surface panels. The method further includes applying a stimulus to the joint support in order to release the first component of the adhesive composition from the capsules of the first set of capsules. As a result, the adhesive composition attaches the joint support to the two panels.

Figure 11:
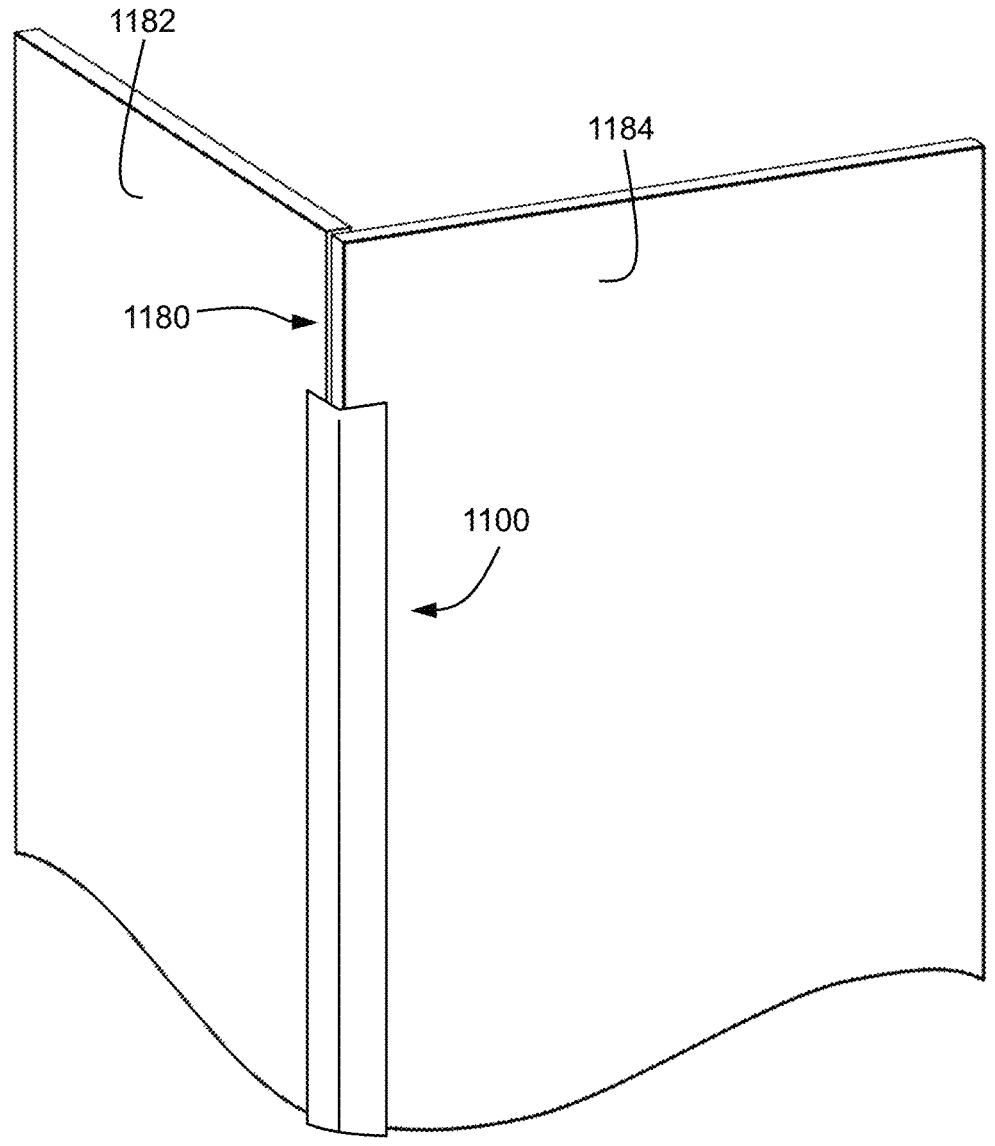
FIG. 11 is a schematic perspective view of a step in a method of securing a joint support to building surface panels according to an embodiment of the disclosure.
Figure 12:
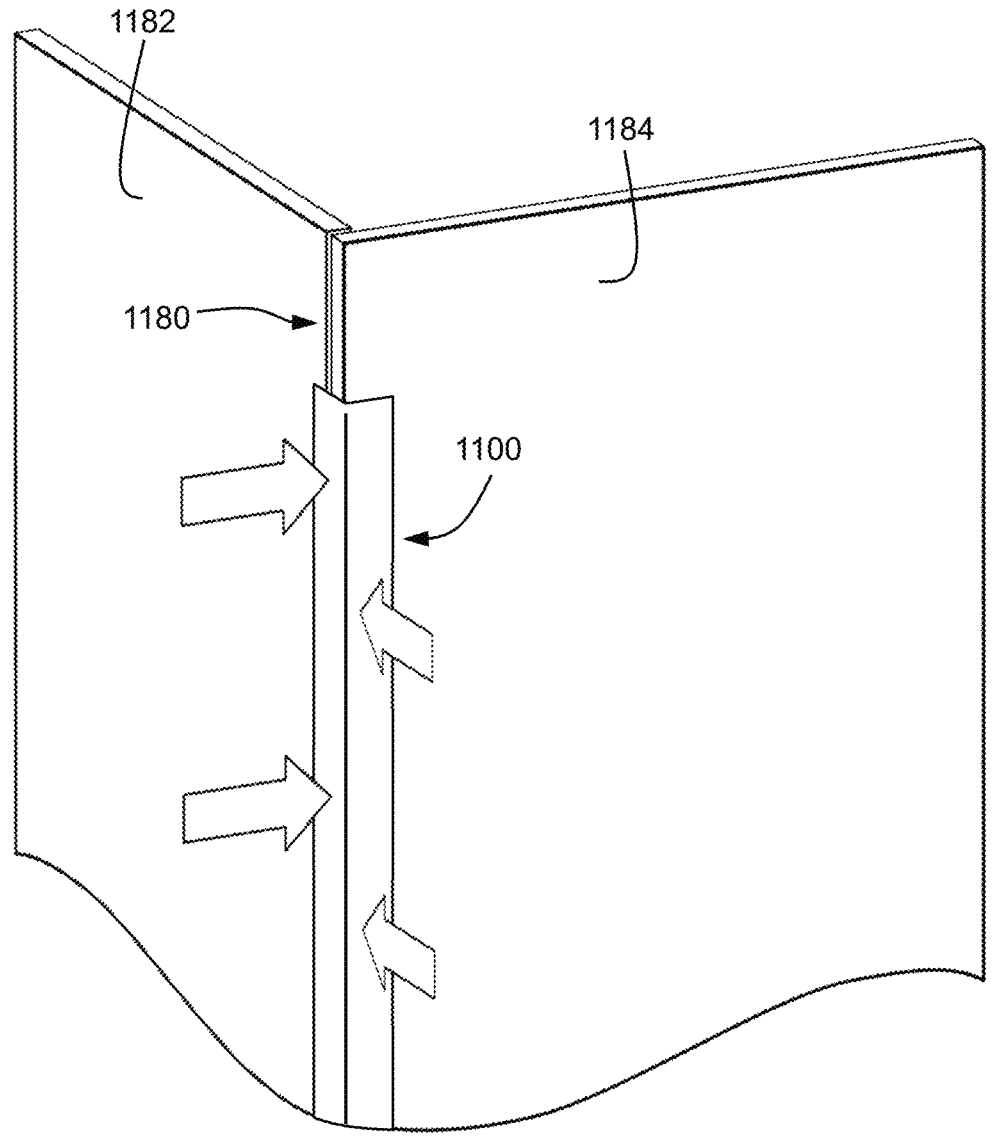
FIG. 12 is a schematic perspective view of another step in the method of FIG. 11.

Such a method is schematically depicted in FIGS. 11 and 12. As shown in FIG. 11, joint support 1100 is placed over an edge of a first building panel 1182 and an edge of a second building panel 1184 so as to cover a portion of a seam 1180 between the two building surface panels. In the depicted embodiment, joint support 1100 is positioned at a distance from the upper edges of first building panel 1182 and second building panel 1184. However, in other embodiments, the joint support extends to the edge of the panels and the portion of the seam that is covered is the entire seam. As depicted in FIG. 12 a stimulus is then applied to joint support 1100 in order to release the first component of the adhesive composition from the first set of capsules so as to attach joint support 1100 to first building panel 1182 and second building panel 1184.

In certain embodiments of the method as otherwise described herein, the stimulus is pressure applied to the joint support against the building surface panels causing the capsules to burst. For example, FIG. 12 schematically depicts joint support 1100 being pressed against the corner formed by first building surface panel 1182 and second building surface panel 1184 so as to release the first component of the adhesive composition from the capsules. As set forth above, in some embodiments, the pressure is applied directly by a builder, for example by hand or with a rolling a tool, while in other embodiments, the pressure required to burst the capsules is applied by a specialized tool or is applied by a machine.

In other embodiments the stimulus is heat applied to the joint and causes at least a portion of the membranes of the capsules to melt. In other embodiments, the stimulus is radiation applied to the joint causing at least a portion of the capsules to rupture. Further, in some embodiments, the stimulus is a solvent introduced to the capsules, which causes at least a portion of the membranes of the capsules to dissolved. Still, in other embodiments, the stimulus is ultrasonic energy that causes the capsules to rupture.

In some embodiments, the stimulus is applied after the joint support is positioned over the first and second building surface panels. In other embodiments the stimulus is applied before the joint support is positioned over the surface panels. For example, in one embodiment using heat as the stimulus, the stimulus is applied before the joint support is positioned over the first and second building surface panels. In other embodiments, the application of radiation, solvent, or ultrasonic energy is applied before the joint support is positioned over the building surface panels.

In certain embodiments of the method as otherwise described herein, the building surface panels are drywall panels. For example, in some embodiments, each of the building surface panels is a panel that includes a gypsum core surrounded by a facing material, such as a paper facing. In other embodiments, the building surface panels have other forms, such as cement boards or concrete panels.

In certain embodiments of the method as otherwise described herein, the released first component mixes with a second component so as to form the adhesive composition. Examples of such cooperative components are explained in further detail above. In some embodiments, the stimulus releases the second component from the capsules of a second set of capsules. In other embodiments, a first stimulus releases the first component from the first set of capsules while a second stimulus release the second component from the second set of capsules. As will be appreciated by those of skill in the art, any combination of the previously-described stimuli are possible.

In certain embodiments of the method as otherwise described herein, the first building surface panel is disposed at an angle to the second building surface panel, and the joint support is a corner bead. For example, as shown in FIGS. 11 and 12, first building surface panel 1182 is disposed at a right angle to second building surface panel 1184, and joint support 1100 is a corner bead that covers the corner seam 1180 between the building surface panels.

Figure 13:
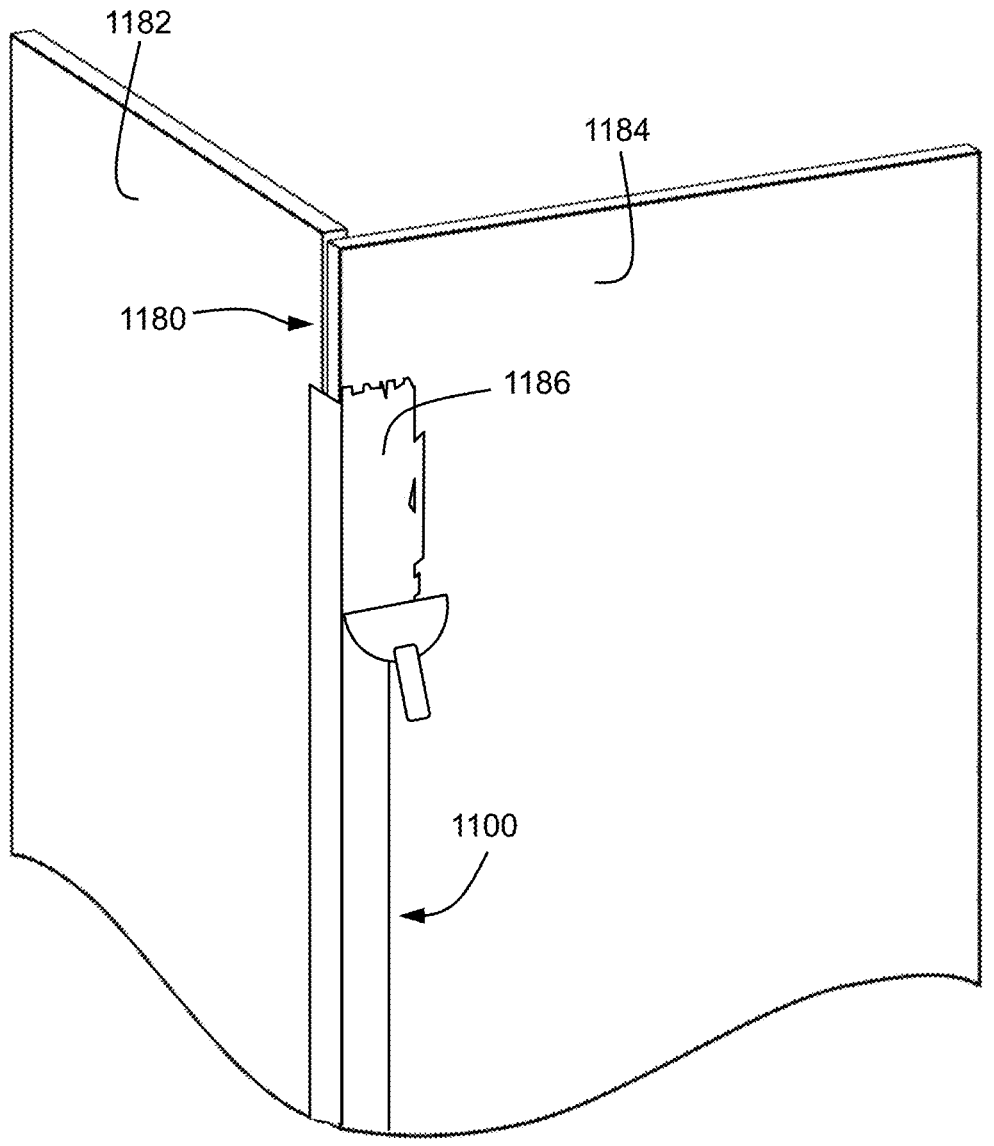
FIG. 13 is a schematic perspective view of yet another step in the method of FIG. 11.

In certain embodiments of the method as otherwise described herein, the method further includes coating the outer surface of the joint support with a joint compound. Such a step is schematically depicted in FIG. 13, where a coating of joint compound 1186 is provided over a portion of joint support 1100 and second building surface panel 1184.

Figure 14:
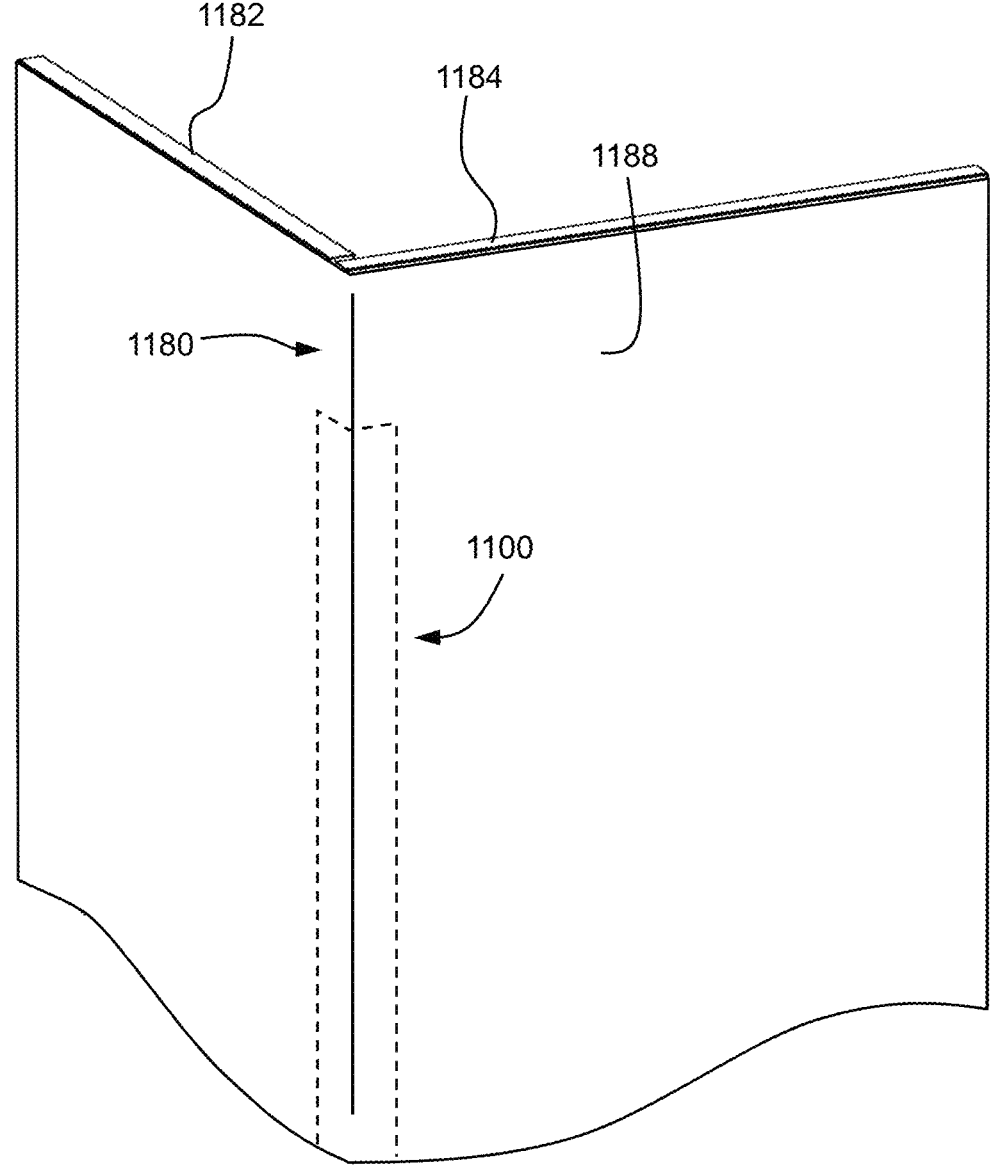
FIG. 14 is a schematic perspective view of still another step in the method of FIG. 11.

In certain embodiments of the method as otherwise described herein, the method further includes covering the joint compound with a layer of paint. For example, as shown in FIG. 14, in a further step, joint support 1100 is covered by a layer of paint 1188. The painted joint forms a clean and sharp corner over the seam of the building surface panels.

In another aspect, the disclosure provides a building surface construction including a first building surface panel and a second building surface panel adjacent to the first building surface panel so as to form a seam between the first building surface panel and second building surface panel. A joint support is disposed over the first building surface panel and the second building surface panel and covers a portion of the seam. The joint support includes a support strip having a width, a length, a first end, a second end, a contact surface facing the first building surface panel and the second building surface panel, and an outer surface. An adhesive composition secures the joint support to the first building surface panel and the second building surface panel, and fragments of membranes of ruptured capsuled are disposed in the adhesive composition.

The support strip may include any of the features of the support strip of the joint support of the disclosure, as described above. Likewise, the adhesive composition may include any of the features of the adhesive composition formed from the adhesive components of the joint support of the disclosure, as also described above.

In certain embodiments of the building surface construction as otherwise described herein, the building surface panels are drywall panels. In other embodiments, the building surface panels have other forms, such as cement boards or concrete panels.

In certain embodiments of the building surface construction as otherwise described herein, the fragments of membranes include at least one of gelatin, gelatin-gum Arabic, melamine formaldehyde, methylol urea, urea formaldehyde, urea-resorcinol-formaldehyde, urea-melamine-formaldehyde, methylol melamine, methylated dimethyl urea, a gelatin anionic polymer, polyamide, and alkyl acrylate-acrylic acid copolymer. In some embodiments, the fragments of membranes remain in the adhesive composition after the capsules are ruptured and the adhesive composition sets. Thus, the ruptured bodies or portions of the membrane of the capsules remain embedded within the adhesive composition that secures the joint support to the building surface products.

Additional aspects of the invention are described by the following enumerated embodiments, which can be combined in any number and in any fashion that is not logically or technically inconsistent.

Embodiment 1. A joint support comprising:
    a support strip including a width, a length, a first end, a second end, a contact surface and an outer surface; and
    an adhesive substance disposed on the contact surface of the support strip, the adhesive substance including:
        a first set of capsules, each capsule of the first set of capsules including an outer membrane enclosing a first component of an adhesive composition.

Embodiment 2. The joint support according to embodiment 1, wherein the adhesive substance includes a second component of the adhesive composition.

Embodiment 3. The joint support according to embodiment 2, wherein the second component is disposed outside of the capsules.

Embodiment 4. The joint support according to embodiment 3, wherein the first set of capsules is embedded in the second component.

Embodiment 5. The joint support according to embodiment 2, wherein the adhesive substance includes a second set of capsules, and wherein the second component is disposed in the capsules of the second set of capsules.

Embodiment 6. The joint support according to any of embodiments 1 to 5, wherein the capsules of the first set of capsules are configured to release the first component upon the application of a stimulus.

Embodiment 7. The joint support according to embodiment 6, wherein the stimulus is the application of pressure.

Embodiment 8. The joint support according to embodiment 6, wherein the stimulus is the application of heat.

Embodiment 9. The joint support according to embodiment 6, wherein the stimulus is radiation.

Embodiment 10. The joint support according to embodiment 6, wherein the stimulus is the addition of a solvent.

Embodiment 11. The joint support according to embodiment 6, wherein the stimulus is the application of ultrasonic energy.

Embodiment 12. The joint support according to any of embodiments 1 to 11, wherein the capsules release the first component by rupturing.

Embodiment 13. The joint support according to embodiment 6 or embodiment 10, wherein the capsules release the first component by dissolving.

Embodiment 14. The joint support according to embodiment 8 or embodiment 9 wherein the capsules release the first component by melting.

Embodiment 15. The joint support according to any of embodiments 1 to 14, wherein the first component of the adhesive composition includes at least one of alkyl acrylate, acrylic acid-alkyl acrylate, methacrylate, epoxy resins, polyvinyl acetate, isocyanate, urethane, and styrene butadiene.

Embodiment 16. The joint support according to any of embodiments 1 to 15, wherein the first component of the adhesive composition includes a curing agent.

Embodiment 17. The joint support according to any of embodiments 1 to 16, wherein the first component of the adhesive composition includes an initiator.

Embodiment 18. The joint support according to any of embodiments 1 to 17, wherein the first component of the adhesive composition includes a solvent.

Embodiment 19. The joint support according to any of embodiments 1 to 18, wherein the first component of the adhesive composition includes a temperature-induced phase change material.

Embodiment 20. The joint support according to any of embodiments 1 to 19, wherein the first component of the adhesive composition includes a stabilizing agent.

Embodiment 21. The joint support according to any of embodiments 1 to 20, wherein the membrane of each capsule of the first set of capsules includes at least one of gelatin, gelatin-gum Arabic, melamine formaldehyde, methylol urea, urea formaldehyde, urea-resorcinol-formaldehyde, urea-melamine-formaldehyde, methylol melamine, methylated dimethyl urea, a gelatin anionic polymer, polyamide, and alkyl acrylate-acrylic acid copolymer.

Embodiment 22. The joint support according to any of embodiments 5 to 21, wherein the membrane of each capsule of the second set of capsules includes at least one of gelatin, gelatin-gum Arabic, melamine formaldehyde, methylol urea, urea formaldehyde, urea-resorcinol-formaldehyde, urea-melamine-formaldehyde, methylol melamine, methylated dimethyl urea, a gelatin anionic polymer, polyamide, or alkyl acrylate-acrylic acid copolymer.

Embodiment 23. The joint support according to any of embodiments 1 to 22, wherein the capsules have an average diameter in a range from 0.1 microns to 3000 microns, e.g., from 1 micron to 500 microns, e.g., from 5 microns to 100 microns.

Embodiment 24. The joint support according to any of embodiments 1 to 23, wherein the contact surface of the support strip is textured.

Embodiment 25. The joint support according to any of embodiments 1 to 24, wherein the joint support is a corner bead.

Embodiment 26. The joint support according to embodiment 25, wherein the support strip includes a body comprising:

a first elongate flange extending from the first end to the second end, and a second elongate flange extending from the first end to the second end.

Embodiment 27. The joint support according to embodiment 26, wherein the body includes a sharp corner connecting the first elongate flange and the second elongate flange.

Embodiment 28. The joint support according to embodiment 27, wherein the body includes a groove disposed on an inside surface of the sharp corner connecting the first elongate flange and the second elongate flange.

Embodiment 29. The joint support according to embodiment 26, wherein the body includes a rounded corner connecting the first elongate flange and the second elongate flange so as to form a bull-nose corner bead.

Embodiment 30. The joint support according to any of embodiments 27 to 29, wherein the first elongate flange and second elongate flange are disposed at an angle in a range from 45° to 160° from one another, e.g., from 60° to 120°, e.g., from 80° to 90°.

Embodiment 31. The joint support according to any of embodiments 26 to 30, wherein the first elongate flange includes perforations therethrough.

Embodiment 32. The joint support according to any of embodiments 26 to 31, wherein the first elongate flange tapers so as to have a greater thickness adjacent to the second elongate flange and a smaller thickness at an outer edge.

Embodiment 33. The joint support according to any of embodiments 1 to 32, wherein the support strip includes a facing sheet disposed at the outer surface.

Embodiment 34. The joint support according to any of embodiments 26 to 33, wherein the first elongate flange is connected to the second elongate flange by a flexible hinge.

Embodiment 35. The joint support according to any of embodiments 26 to 34, wherein the body is formed of plastic.

Embodiment 36. The joint support according to embodiment 35, wherein the body includes at least one of High Density Polyethylene (HDPE), Polyethylene Terephthalate (PET), or Acrylonitrile Butadiene Styrene (ABS).

Embodiment 37. The joint support according to embodiment 34 or embodiment 35, wherein the body is reinforced with a fibrous material, e.g., glass fibers or cellulous fibers.

Embodiment 38. The joint support according to any of embodiments 26 to 34, wherein the body is formed of metal.

Embodiment 39. The joint support according to any of embodiments 26 to 38, wherein a width of the first elongate flange is in a range from % inch to 5 inches, e.g., 1 inch to 3 inches, e.g., from 1.5 inches to 2 inches.

Embodiment 40. The joint support according to any of embodiments 1 to 39, wherein a length of the joint support is in a range from 4 feet to 20 feet, e.g., from 6 feet to 15 feet, e.g., from 8 feet to 12 feet.

Embodiment 41. A method of installing the joint support according to any of embodiments 1 to 40 on a joint between two building surface panels, the method comprising:

placing the joint support over a first building surface panel and a second building surface panel so as to cover a portion of a seam between the first and second building surface panels and with the contact surface of the joint support adjacent to a surface of the building surface panels;

applying a stimulus to the joint support in order to release the first component of the adhesive composition from the capsules of the first set of capsules, wherein the adhesive composition attaches the joint support to the two building surface panels.

Embodiment 42. The method according to embodiment 41, wherein the stimulus is pressure applied to the joint support against the building surface panels causing the capsules to burst.

Embodiment 43. The method according to embodiment 41, wherein the stimulus is heat applied to the joint causing at least a portion of the membranes of the capsules to melt.

Embodiment 44. The method according to embodiment 41, wherein the stimulus is radiation applied to the joint causing at least a portion of the capsules to rupture.

Embodiment 45. The method according to embodiment 41, wherein the stimulus is a solvent introduced to the capsules and causing at least a portion of the membranes of the capsules to dissolve.

Embodiment 46. The method according to embodiment 41, wherein the stimulus is ultrasonic energy causing the capsules to rupture.

Embodiment 47. The method according to any of embodiments 42 to 46, wherein the joint support is placed over the first building surface panel and the second building surface panel before the stimulus is applied to the joint support.

Embodiment 48. The method according to any of embodiments 43 to 46, wherein the stimulus is applied to the joint support before the joint support is placed over the first building surface panel and the second building surface panel.

Embodiment 49. The method according to any of embodiments 41 to 48, wherein the building surface panels are drywall panels.

Embodiment 50. The method according to any of embodiments 41 to 49, wherein the released first component mixes with a second component so as to form the adhesive composition.

Embodiment 51. The method according to embodiment 50, wherein the stimulus releases the second component from the capsules of a second set of capsules.

Embodiment 52. The method according to any of embodiments 41 to 51, wherein the first building surface panel is disposed at an angle to the second building surface panel, and wherein the joint support is a corner bead.

Embodiment 53. The method according to any of embodiments 41 to 52, further comprising coating the outer surface of the joint support with a joint compound.

Embodiment 54. The method according to embodiment 53, further comprising covering the joint compound with a layer of paint.

Embodiment 55. A building surface construction comprising:
a first building surface panel;
a second building surface panel adjacent to the first building surface panel forming a seam between the first building surface panel and second building surface panel;
a joint support disposed over the first building surface panel and the second building surface panel and covering a portion of the seam, the joint support including a support strip having a width, a length, a first end, a second end, a contact surface facing the first building surface panel and the second building surface panel, and an outer surface;
an adhesive composition securing the joint support to the first building surface panel and the second building surface panel; and
fragments of membranes of ruptured capsuled disposed in the adhesive composition.

Embodiment 56. The building surface construction according to embodiment 55, wherein the building surface panels are drywall panels.

Embodiment 57. The building surface construction according to embodiment 55 or embodiment 56, wherein the adhesive composition includes a monomer, oligomer or polymer based on at least one of alkyl acrylate, acrylic acid-alkyl acrylate, methacrylate, epoxy resins, polyvinyl acetate, isocyanate, urethane, and styrene butadiene.

Embodiment 58. The building surface construction according to any of embodiments 55 to 57, wherein the fragments of membranes include a polymer based on at least one of gelatin, gelatin-gum Arabic, melamine formaldehyde, methylol urea, urea formaldehyde, urea-resorcinol-formaldehyde, urea-melamine-formaldehyde, methylol melamine, methylated dimethyl urea, a gelatin anionic polymer, polyamide, and alkyl acrylate-acrylic acid copolymer.

Embodiment 59. The building surface construction according to any of embodiments 55 to 58, wherein the adhesive composition includes a catalyst.

Embodiment 60. The building surface construction according to any of embodiments 55 to 59, wherein the adhesive composition includes an initiator.

Embodiment 61. The building surface construction according to any of embodiments 55 to 60, wherein the adhesive composition includes a solvent.

Embodiment 62. The building surface construction according to any of embodiments 55 to 61, wherein the adhesive composition includes a temperature-induced phase change material.

Embodiment 63. The building surface construction according to any of embodiments 55 to 62, wherein the adhesive composition includes a stabilizer.

Embodiment 64. The building surface construction according to any of embodiments 55 to 63, wherein the first building surface panel is disposed at an angle to the second building surface panel, and the joint support is a corner bead.

Embodiment 65. The building surface construction according to embodiment 64, wherein the support strip includes a body comprising:
a first elongate flange extending from the first end to the second end, and
a second elongate flange extending from the first end to the second end.

Embodiment 66. The building surface construction according to embodiment 65, wherein the body includes a sharp corner connecting the first elongate flange and the second elongate flange.

Embodiment 67. The building surface construction according to embodiment 66, wherein the body includes a groove disposed on an inside surface of the sharp corner connecting the first elongate flange and the second elongate flange.

Embodiment 68. The building surface construction according to embodiment 65, wherein the body includes a rounded corner connecting the first elongate flange and the second elongate flange so as to form a bull-nose corner bead.

Embodiment 69. The building surface construction according to any of embodiments 65 to 68, wherein the first elongate flange and second elongate flange are is disposed at an angle in a range from 45° to 160° from one another, e.g., from 60° to 120°, e.g., from 80° to 90°.

Embodiment 70. The building surface construction according to embodiment 65, wherein the first elongate flange is connected to the second elongate flange by a flexible hinge.

Embodiment 71. The building surface construction according to any of embodiments 65 to 70, wherein the body is formed of plastic.

Embodiment 72. The building surface construction according to embodiment 71, wherein the body includes at least one of High Density Polyethylene (HDPE), Polyethylene Terephthalate (PET), or Acrylonitrile Butadiene Styrene (ABS).

Embodiment 73. The building surface construction according to embodiment 71 or embodiment 72, wherein the body is reinforced with a fibrous material, e.g., glass fibers or cellulous fibers.

Embodiment 74. The building surface construction according to any of embodiments 65 to 70, wherein the body is formed of metal.

Embodiment 75. The building surface construction according to any of embodiments 65 to 74, wherein the first elongate flange includes perforations therethrough.

Embodiment 76. The building surface construction according to any of embodiments 65 to 75, wherein the first elongate flange tapers so as to have a greater thickness adjacent to the second elongate flange and a smaller thickness at an outer edge.

Embodiment 77. The building surface construction according to any of embodiments 65 to 76, wherein a width of the first elongate flange is in a range from % inch to 5 inches, e.g., 1 inch to 3 inches, e.g., from 1.5 inches to 2 inches.

Embodiment 78. The building surface construction according to any of embodiments 55 to 77, wherein the support strip includes a paper facing disposed at the outer surface.

Embodiment 79. The building surface construction according to any of embodiments 55 to 78, wherein a length of the joint support is in a range from 4 feet to 20 feet, e.g., from 6 feet to 15 feet, e.g., from 8 feet to 12 feet.

Embodiment 80. The building surface construction according to any of embodiments 55 to 79, further comprising joint compound covering an outer surface of the joint support.

Embodiment 81. The building surface construction according to embodiment 80, further comprising a layer of paint covering the joint compound.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A method of installing a joint support on a joint between a first drywall panel and a second drywall panel, the joint support comprising:

a support strip including a width, a length in the range of 4-20 feet, a first end, a second end, a contact surface and an outer surface; and an adhesive substance disposed on the contact surface of the support strip, the adhesive substance including:

a first set of capsules, each capsule of the first set of capsules including an outer membrane enclosing a first component of an adhesive composition, the method comprising:

placing the joint support over the joint between the first drywall panel and the second drywall panel so as to cover a portion of a seam between the first and second drywall panels and with the contact surface of the joint support disposed against a surface of each of the drywall panels; and then applying a pressure to the joint support by pushing the joint support against the first drywall panel and against the second drywall panel, the pressure releasing the first component of the adhesive composition from the capsules of the first set of capsules, wherein the adhesive composition attaches the joint support to the first drywall panel and the second drywall panel, wherein the first drywall panel and the second drywall panel form an interior building surface.

2. The method according to claim 1, wherein the adhesive substance includes a second component of the adhesive composition.

3. The method according to claim 2, wherein the second component is disposed outside of the capsules.

4. The method according to claim 3, wherein the first set of capsules is embedded in the second component.

5. The method according to claim 2, wherein the adhesive substance includes a second set of capsules, and wherein the second component is disposed in the capsules of the second set of capsules.

6. The method according to claim 1, wherein the capsules release the first component by rupturing.

7. The method according to claim 1, wherein the first component of the adhesive composition includes a monomer or oligomer based on at least one of alkyl acrylate, acrylic acid-alkyl acrylate, methacrylate, epoxy resins, polyvinyl acetate, isocyanate, urethane, and styrene butadiene.

8. The method according to claim 1, wherein the capsules have an average diameter in a range from 0.1 microns to 3000 microns.

9. The method according to claim 1, wherein the contact surface of the support strip is textured.

10. The method according to claim 1, wherein the joint support is a corner bead.

11. The method according to claim 10, wherein the support strip includes a body comprising:

a first elongate flange extending from the first end to the second end, and a second elongate flange extending from the first end to the second end.

12. The method according to claim 11, wherein the body includes a sharp corner connecting the first elongate flange and the second elongate flange.

13. The method according to claim 12, wherein the body includes a groove disposed on an inside surface of the sharp corner connecting the first elongate flange and the second elongate flange.

14. The method according to claim 1, further comprising, after the application of the pressure, coating the outer surface of the joint support with a joint compound.

15. The method according to claim 1, further comprising, after the application of the pressure, covering the outer surface of the joint support with a layer of paint.

16. The method according to claim 1, wherein the first drywall panel and the second drywall panel form an interior building wall surface.

17. The method according to claim 1, wherein the first drywall panel and the second drywall panel form an interior building ceiling surface.

* * * * *